(12) United States Patent
Cazaux et al.

(10) Patent No.: US 8,777,490 B2
(45) Date of Patent: Jul. 15, 2014

(54) METHOD FOR DYNAMICALLY ABSORBING SHOCKS IN A POWER SHAFT, IN PARTICULAR A SUPERCRITICAL SHAFT, AND SHOCK-ABSORBING ARCHITECTURE FOR IMPLEMENTING SAID METHOD

(75) Inventors: David Cazaux, Nousty (FR); Sylvain Pierre Votie, Aressy (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/703,642

(22) PCT Filed: Jun. 29, 2011

(86) PCT No.: PCT/FR2011/051517
§ 371 (c)(1),
(2), (4) Date: Dec. 12, 2012

(87) PCT Pub. No.: WO2012/001304
PCT Pub. Date: Jan. 5, 2012

(65) Prior Publication Data
US 2013/0089284 A1 Apr. 11, 2013

(30) Foreign Application Priority Data
Jul. 1, 2010 (FR) ...................................... 10 55272

(51) Int. Cl.
*F16C 27/00* (2006.01)
(52) U.S. Cl.
USPC .............................. 384/535; 384/99; 384/581
(58) Field of Classification Search
USPC ........... 384/99, 101, 102, 215, 535, 536, 581, 384/582, 583
See application file for complete search history.

(56) References Cited

U.S. PATENT DOCUMENTS

| | | | | |
|---|---|---|---|---|
| 3,979,155 | A | * | 9/1976 | Sood et al. ..................... 384/117 |
| 4,027,931 | A | * | 6/1977 | Streifert ......................... 384/117 |
| 2003/0190099 | A1 | | 10/2003 | Alam et al. |
| 2004/0022463 | A1 | | 2/2004 | Dusserre-Telmon et al. |
| 2006/0204153 | A1 | | 9/2006 | Alam et al. |

FOREIGN PATENT DOCUMENTS

| | | | | |
|---|---|---|---|---|
| EP | | 374769 A1 * | 6/1990 | .............. F16D 41/20 |
| EP | | 1 375 941 | 1/2004 | |

OTHER PUBLICATIONS

International Search Report Issued Oct. 7, 2011 in PCT/FR11/51517 Filed Jun. 29, 2011.

* cited by examiner

*Primary Examiner* — Phillip A Johnson
(74) *Attorney, Agent, or Firm* — Oblon, Spivak, McClelland, Maier & Neustadt, L.L.P.

(57) ABSTRACT

An architecture making it possible to provide sufficient absorption of shocks for a power shaft while maintaining rigidity at front bearings so as to not compromise meshing of power teeth of a drive pinion. A compressible dynamic shock absorption is provided in alignment with a downstream shock absorber of an additional meshing. An assembly for dynamically absorbing shocks for a power shaft includes upstream and downstream bearings including power rollers mounted on two casings and flanking a speed-reducing teeth meshing. The downstream bearing is coupled to at least one additional roller bearing associated with a compressible shock absorber to form a downstream shock absorber axially offset relative to the upstream bearing opposite the teeth meshing. Both downstream bearings are connectable by a flexible frame mounted on the common casing. The architecture can be used for power-transmission shafts, for example supercritical shafts in turbine engines.

11 Claims, 3 Drawing Sheets

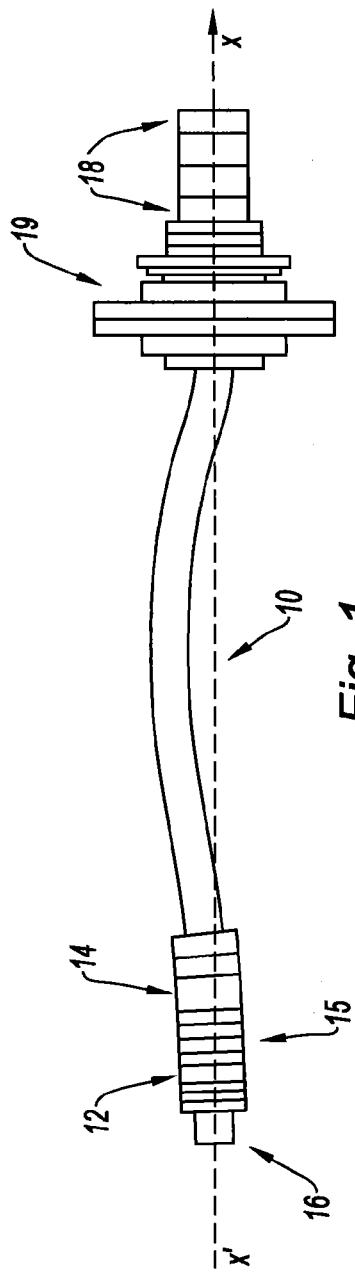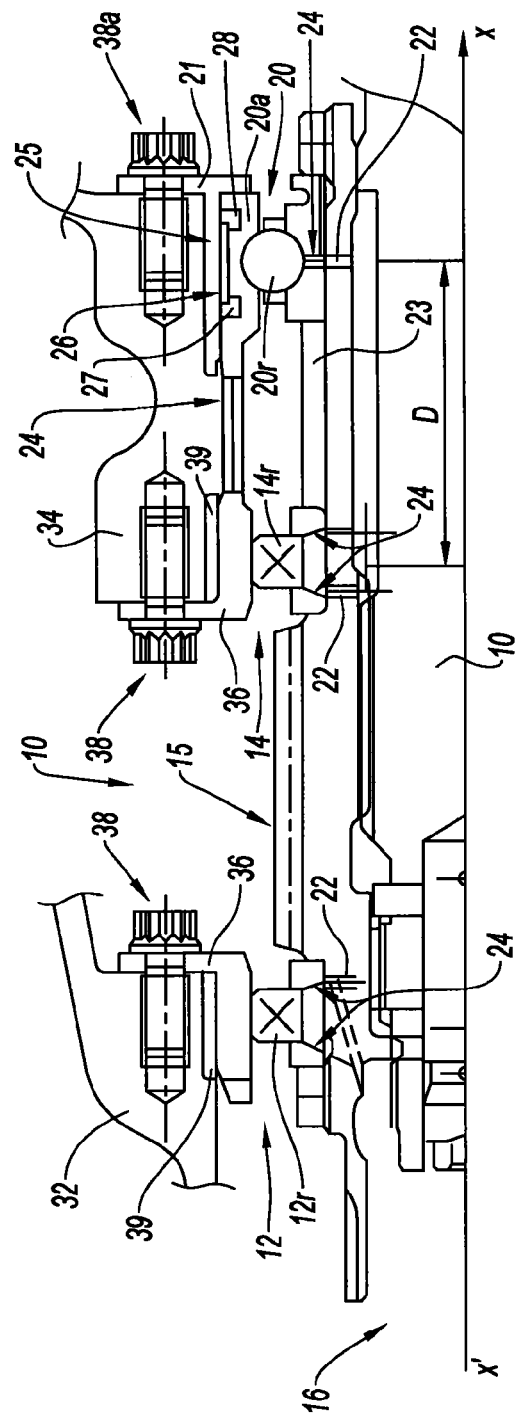

METHOD FOR DYNAMICALLY ABSORBING SHOCKS IN A POWER SHAFT, IN PARTICULAR A SUPERCRITICAL SHAFT, AND SHOCK-ABSORBING ARCHITECTURE FOR IMPLEMENTING SAID METHOD

BACKGROUND OF THE INVENTION

1. Field of the Invention

The invention relates to a method for dynamically absorbing shocks in a power shaft, in particular a supercritical shaft, as well as to a shock-absorbing architecture capable of implementing such a method.

2. Description of the Related Art

Power rotating shafts, in particular in turboshaft engines, have nominal operating ranges which can exceed their first critical speed of deflection. By definition, the operating range of supercritical shafts always exceeds their first critical speed. At resonance, which occurs when crossing a critical speed, power shafts undergo overload phenomena which amplify deformations and strain caused by the imbalances of the shaft.

A modal analysis of the architecture of a given power shaft—which typically has a front bearing and a rear bearing—makes it possible to calculate the values of the critical speeds, the shape of the modal deformations as well as the distribution of the strain energy between the components parts of the drive shaft: front, rear bearings and shaft linking these bearings.

An exemplary modal analysis of a given supercritical shaft supplies a value of the first critical speed equal to 15 000 rpm, that is 70% of its nominal speed, with a distribution of strain energy equal to 10% at the front bearing, 30% at the rear bearing and 60% at the shaft.

In order to absorb the amplified stress, which is associated with the use of supercritical shafts notably, shock-absorbing bearings with an oil film, also called "squeeze film", make it possible to limit the amplitude of the overload caused when crossing the critical speed.

However, these shafts may have power tooth systems, which is generally the case on turboshaft engines with speed reducer used in the aeronautical domain when the rotation speed of the power shaft is high. The speed reducer makes it possible to convert the power in order to feed the receivers (helicopter main transmission gearbox, electric generator, etc.). In that case, the use of squeeze films with the bearings flanking the tooth systems of the power shaft is excluded. Because these bearings must have enough rigidity to limit any radial displacement of the pinion undergoing the meshing forces, in order to transmit the driving torque and avoid any disengagement or premature wear. Now, squeeze films require the radial displacement of the rolling-element system so that they can be compressed and produce their shock absorbing effect. The use of squeeze films is thus incompatible with these bearings used for flanking tooth systems.

The strain energy remaining always important at the rear bearing—where it is superior to 10%—and the shock absorption being difficult to achieve at the front bearing because of the presence of the power tooth systems, the shock absorbing systems of the architectures of engines with speed reducer and critical shaft were thus arranged at the rear bearings of the drive shaft.

However, in some modern architectures, the rear bearings do not participate any more in the modal deformation, no external shock absorption being then possible at these rear bearings. So, the front bearings concentrate, typically, about 25% of the strain energy and the shaft approximately 75%: the rear bearings—which do not operate as shock absorbers—absorb then practically no deformation (less than 1%). The bearings of the drive pinion become thus the only area where it is possible to provide the whole drive shaft with external shock absorption, 75% of strain energy in the shaft being an unacceptable percentage.

BRIEF SUMMARY OF THE INVENTION

The invention proposes an architecture making it possible to provide the sufficient absorption of shocks while maintaining rigidity at the front bearings so as not to compromise the meshing of the power tooth systems. For this purpose, dynamic compressible shock absorption is provided as an extension to the bearing downstream from the meshing.

More precisely, the object of the invention is a method for dynamically absorbing shocks in a power shaft comprising a speed-reducing meshing at a drive pinion, flanked by a set of upstream and downstream shaft supports with respect to the meshing. In this architecture, the set of supports extends downstream with at least one additional support coupled with a compressible shock absorber moving orbitally in order to form a downstream shock absorber that is axially offset with regard to the upstream support opposite the power meshing. This offset architecture makes it possible to provide dynamic shock absorption.

According to particular embodiments:

the downstream extension is achieved by ways of a flexible link forming a stiffness-adjustment lever making it possible to adjust the distribution of the strain energy in the shaft and the absorbed energy which results from it; so, the flexible link makes it possible to control the rigidity of the downstream shock absorber and thus to limit the effect of the critical speed by better distributing the strain energy in the shaft;

the downstream offset of the additional shock absorber is calculated iteratively so as to place this shock absorber in the deformation of the shaft in order to provide maximum shock absorption by radial compression; the meshing is thus flanked by two stiff bearings providing an optimal torque transmission.

The invention also relates to an assembly for dynamically absorbing shocks in a power shaft and implementing the above method. Such an assembly comprises upstream and downstream bearings, with power rollers, flanking a meshing of speed-reducing tooth systems. The downstream bearing is coupled with at least one additional bearing with rolling elements associated with a compressible shock absorber to form a downstream shock absorber that is axially offset with regard to the upstream bearing opposite the meshing of the tooth systems.

According to particular embodiments:

the two downstream bearings are linked by ways of a flexible frame mounted on a common casing;

the compressible shock absorber consists of a squeeze film, in particular a squeeze film centred on the shaft by the flexible frame;

the rolling-element system of the additional downstream bearing can be a ball bearing or a roller bearing.

BRIEF DESCRIPTION OF THE SEVERAL VIEWS OF THE DRAWINGS

Other characteristics and advantages of the present invention will appear while reading the detailed exemplary embodiment which follows, in reference to the annexed drawings showing respectively:

in FIG. 1, a global view of a modal deformation of a classic power shaft mounted between front and rear bearings linked with a drive pinion;

in FIG. 2, a half-view, as a (partial) longitudinal section, of the reducing drive pinion linked with the power shaft of FIG. 1 according to an architecture corresponding to the invention;

DETAILED DESCRIPTION OF THE INVENTION

In the description which follows, the terms front or upstream relate, by comparison along an axis X'X, to positions of elements arranged by the side of the drive pinion or closer to the pinion, while the terms downstream or rear designate, by comparison along the axis X'X, the position of elements that are more distant from the drive pinion or towards the part which creates the engine torque. Besides, the same reference marks designate identical or equivalent elements.

Figure 4A:
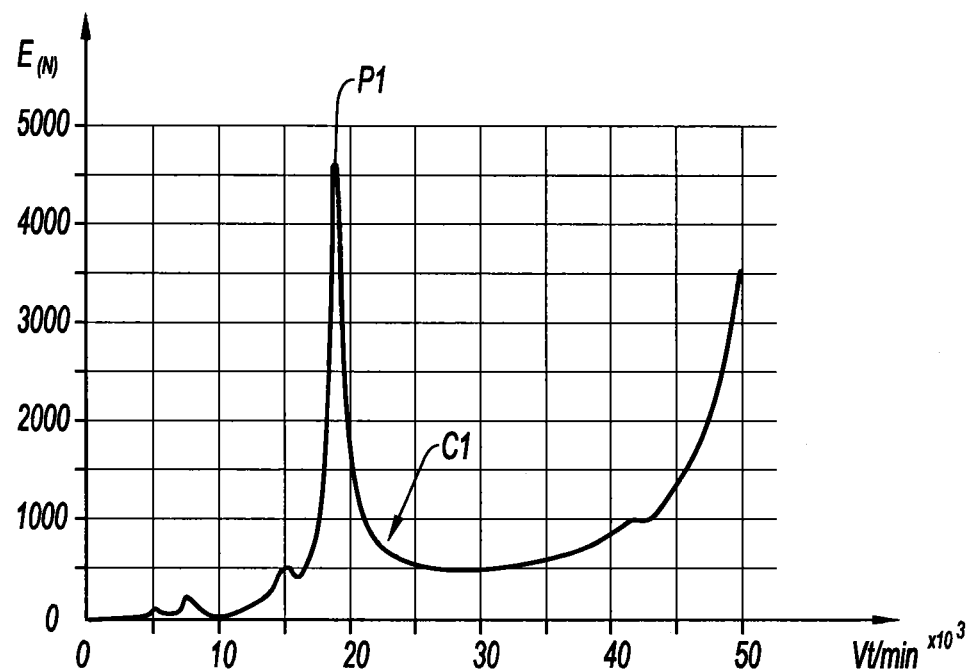

In reference to the global view of FIG. 1, a power shaft 10 for driving the turbine 19 shows, as a modal deformation with regard to its axis X'X at rest, a deflection integrating approximately 75% of the strain energy while the rear bearings 18 hardly take part (less than 1%) in the shock absorption. The front bearings, 12 and 14, which flank the tooth systems 15 on which the speed-reducing drive pinion 16 is mounted, bear then approximately 25% of the strain energy which is not absorbed. Such a distribution is unacceptable, in particular at resonance. The strain undergone by the rolling-element systems at the front bearings is illustrated in FIG. 4a and discussed below.

An architecture corresponding to the invention, such as that illustrated in FIGS. 2 (sectional half-view) and 3 (perspective view), makes it possible to absorb the strain undergone by the front bearings 12 and 14, consisting of hard roller bearings 12r and 14r, without damaging the meshing of the front pinion. The bearings 12 and 14 are mounted on casings 32 and 34 respectively, by means of flanges 36 through screw-and-nut assemblies 38 and annular rings 39.

Figure 3:
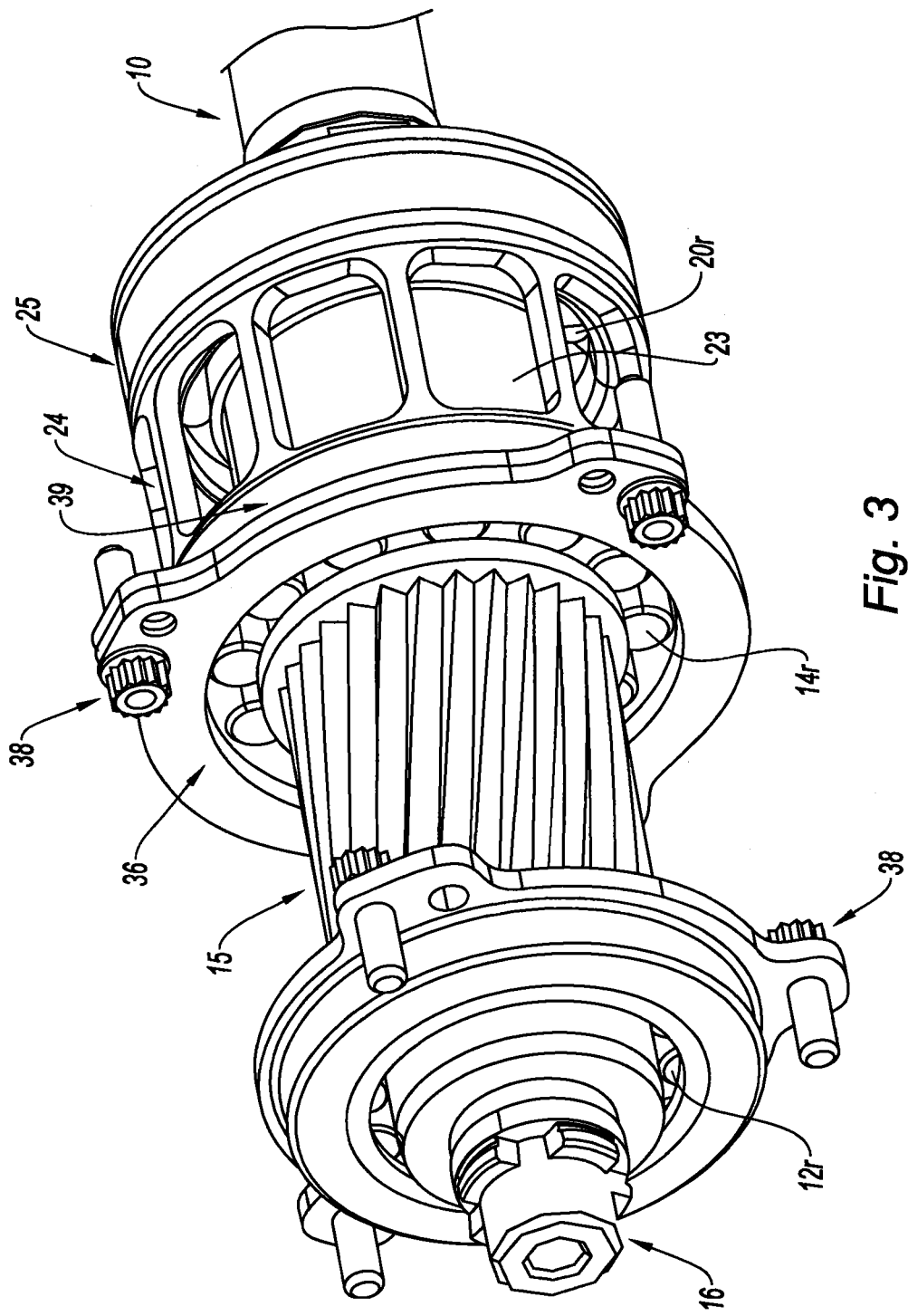
in FIG. 3, a view in (partial) perspective of the power shaft equipped with a dynamic shock absorber according to the invention, and In FIGS. 4a and 4b, two diagrams of strain at front bearings of the power shaft as a function of the rotation speed, in the absence and in the presence of the dynamic shock absorber according to the invention respectively.

In this architecture, the front bearing 14, situated downstream with regard to the first upstream bearing 12 according to the directed axis X'X of the shaft 10, and an additional downstream bearing 20 are mounted at the ends of the casing 34. The bearings are lubricated through ducts 22 that are coupled with jets 24. The flange 36 extends axially with a squirrel-cage-type flexible frame 24 made of holed steel, in turn extending with the outside frame 20a of the bearing 20. The flexible frame 24 thus links the rolling-element systems 14r and 20r, the bearing 20 being maintained in position by the flange 36 via the flexible frame 24. As an option, a flange 21, which is fixed by means of a screw-and-nut assembly 38a and extends axially with a tongue 25, makes it possible to protect the casing 34 (the flange 21 and the casing 34 are not shown in FIG. 3 so as not to mask the frame). The rolling-element system 20r of this bearing, balls in this example, is a "thrust" rolling-element system—in the sense that it takes the axial strain of the whole drive shaft.

The casing 34 advantageously forms, in its central part, a squirrel-cage-type flexible frame 24, made of holed steel, between the two bearings 14 and 20. The bearing 20, which provides dynamic shock absorption through coupling with the flexible frame 24, is thus offset with regard to the upstream bearing 12 when taking the central section of the power teeth 15 as a reference. So, the flexible frame makes it possible to control the rigidity of the bearing 20 and thus to adjust the critical speed.

To achieve the dynamic shock absorption of the additional bearing 20 mounted on the flexible frame 24, the rolling-element system 20r is radially combined with a squeeze film 26. This is an oil film arranged between the ring 25 and the outside frame 20a of the bearing 20, extending axially according to the axis X'X between two seal grooves 27 and 28 and preferentially including compression-ring seals in order to control the leak rates. Alternatively, instead of being centred on the frame, the squeeze film can be directly mounted on the casing 34 with a "floating" bearing outer race (not shown).

The percentage of strain energy which is absorbed by the squeeze film at the crossing of the mode of the shaft can then be adjusted thanks to the flexibility of the frame 24, for instance with a shock absorption which is at least equal to approximately 15%. Thus, such an architecture enables the following distribution: 15 to 25% of the energy absorbed in the front bearings/70 to 60% of the energy absorbed in the shaft/15% of non-absorbed energy. Such distributions are quite acceptable from a mechanical point of view.

Furthermore, the offset "d", which expresses the offset position of the bearing 20 with regard to the bearing 14, achieved by means of an spacer 23, is adjusted iteratively so that the shock-absorbing bearing 20 lies in the deformation of the shaft. A compromise is reached between the shortest offset, to reduce bulk, and the longest offset, to increase the shock absorption of the mode. The value of the offset is also a function of the range of running speeds, the length of the tooth systems and shaft, as well as the shaft diameter, notably. The offset "d" has the effect of best compressing the squeeze film, which increases its efficiency and makes it possible to provide maximum shock absorption, in particular when crossing the critical speed of deflection of the shaft (also called resonance). In the exemplary embodiment, the offset "d" is set to 40 mm.

Actually, when crossing this speed—corresponding to the transmission of a low torque into the drive pinion—the shaft undergoes an orbital movement with regard to its axis X'X under the influence of its own imbalance (see FIG. 1). The shock-absorbing bearing 20 mounted on the flexible frame 24 follows the same movement and causes the compressing of the oil film 26 thereby amplifying the dynamic shock absorption.

Besides, the rigidity of the bearings flanking the power tooth systems 15 makes it possible to ensure a good mutual behaviour of the tooth systems when the engine torque is exerting, also when crossing the deformations of the shaft or at full power.

Figure 4B:
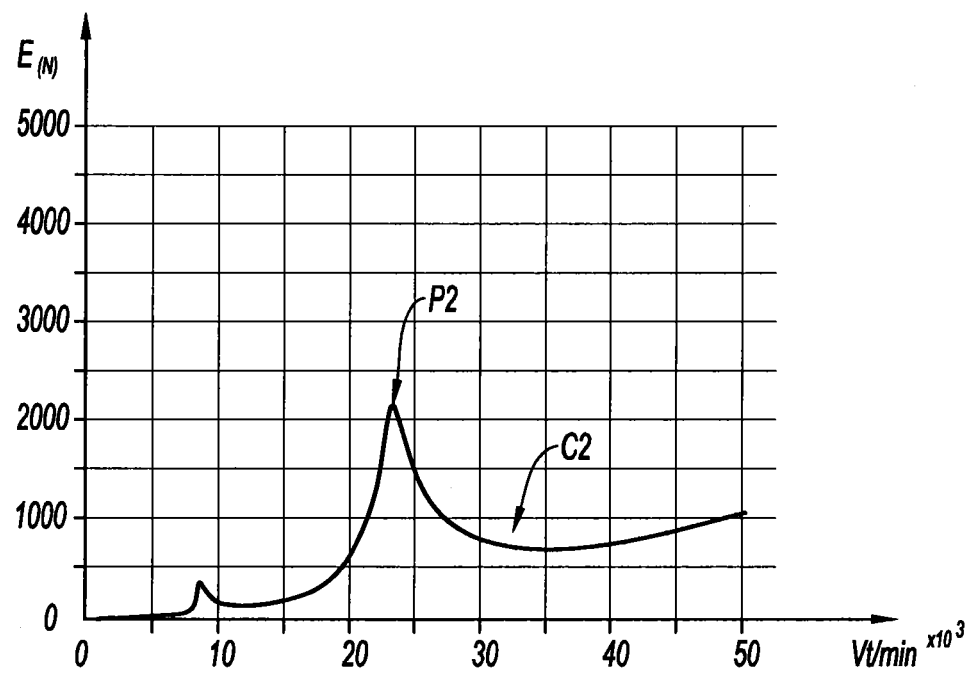

The diagrams of FIGS. 4a and 4b illustrate the strain in Newtons E(N) exerted on the rolling-element systems of a set of front bearings of a power shaft, expressed as a function of the rotation speed V in revolutions per minute (rpm), in the absence and in the presence of the dynamic shock absorber according to the invention respectively.

The first curve C1 (FIG. 4a) presents, in particular, a very important peak of resonance P1 of about 4500 N, during the modal crossing of the shaft at the critical speed of 19 000 rpm. The undergone strain can generate premature wears or demeshing of the mutually engaged tooth systems.

The second curve C2 (FIG. 4b) no longer presents an important peak of strain when the shaft crosses the critical speed of 24 000 rpm, thanks to the dynamic shock absorption achieved by an architecture of the above described type. The recorded peak P2 only amounts to approximately 1600 N, which remains quite acceptable.

The invention is not limited to the described and shown exemplary embodiments. For instance, it is possible to provide types of compressible shock absorption other than squeeze film: elastomer seal, compressed air, magnetic bearing, etc. Moreover, the flexible link can be achieved by means of an alternation of various materials, a flexible alloy or wire braids. Besides, several additional bearings can be provided according to an adjusted layout aiming at producing accurately adjusted front shock absorption.

The invention claimed is:

1. An assembly for dynamically absorbing shocks in a power shaft, comprising:
   an upstream bearing and a downstream bearing, with power rollers, flanking a speed-reducing teeth meshing at a drive pinion;
   an additional bearing with rolling elements having a compressible shock absorber, said additional bearing disposed downstream of and coupled with the downstream bearing to form a downstream shock absorber that is axially offset with respect to the upstream bearing opposite the teeth meshing; and
   a flexible frame disposed between the downstream bearing and the additional bearing and mounted on a common casing, the flexible frame linking the downstream bearing and the additional bearing,
   wherein the shock absorber moves orbitally.

2. The assembly for dynamically absorbing shocks according to claim 1, wherein the offset of the shock absorber is provided so as to place the shock absorber in a deformation of the shaft to provide maximum shock absorption by radial compression.

3. The assembly for dynamically absorbing shocks according to claim 1, in which the compressible shock absorber includes squeeze film.

4. The assembly for dynamically absorbing shocks according to claim 3, wherein the squeeze film is centered on the shaft by a flexible frame.

5. The assembly for dynamically absorbing shocks according to claim 1, wherein the additional downstream bearing is a ball bearing.

6. The assembly for dynamically absorbing shocks according to claim 1, wherein the additional downstream bearing is a roller bearing.

7. The assembly for dynamically absorbing shocks according to claim 1, wherein the power shaft is a supercritical shaft.

8. The assembly for dynamically absorbing shocks according to claim 1, wherein the flexible frame is a squirrel-cage-type frame.

9. The assembly for dynamically absorbing shocks according to claim 1, wherein the downstream flange is mounted to the common casing via a flange, the flange extending axially with the flexible frame.

10. The assembly for dynamically absorbing shocks according to claim 9, wherein the flexible frame extends axially with an outside frame of the additional bearing.

11. The assembly for dynamically absorbing shocks according to claim 1, wherein the downstream bearing and the additional bearing are mounted at ends of the casing.

* * * * *